United States Patent [19]
Suzuki et al.

[11] Patent Number: 6,082,899
[45] Date of Patent: Jul. 4, 2000

[54] LINEAR MOTION GUIDE UNIT

[75] Inventors: Osamu Suzuki; Takashi Yatsu, both of Kanagawa-ken, Japan

[73] Assignee: Nippon Thompson Co., Ltd., Tokyo, Japan

[21] Appl. No.: 09/144,853

[22] Filed: Sep. 1, 1998

[30] Foreign Application Priority Data

Sep. 18, 1997 [JP] Japan .................................. 9-270348

[51] Int. Cl.[7] .................................................. F16C 29/06
[52] U.S. Cl. ................................... 384/13; 384/45; 184/5
[58] Field of Search ................................. 384/13, 15, 43, 384/44, 45; 184/5, 100

[56] References Cited

U.S. PATENT DOCUMENTS

| | | |
|---|---|---|
| 3,353,875 | 11/1967 | Karge . |
| 5,492,413 | 2/1996 | Tsukada .................................. 384/15 |
| 5,494,354 | 2/1996 | Tsukada .................................. 384/13 |
| 5,547,285 | 8/1996 | Hutzel et al. ............................ 384/15 |
| 5,678,927 | 10/1997 | Yabe et al. .............................. 384/13 |

FOREIGN PATENT DOCUMENTS

| | | |
|---|---|---|
| 4404109 | 10/1994 | Germany . |
| 19628026 | 1/1997 | Germany . |
| 61-283634 | 12/1986 | Japan . |
| 6-346919 | 12/1994 | Japan . |
| 7-035146 | 2/1995 | Japan . |
| 8-200362 | 8/1996 | Japan . |
| 8-247144 | 9/1996 | Japan . |
| 8-247145 | 9/1996 | Japan . |
| 9-053637 | 2/1997 | Japan . |

OTHER PUBLICATIONS

Patent Abstract of Japan, Inventor—Ueki Fumio, Title—Lubrication Linear Guide Device for Polymer Containing Lubricant, Pub. No. 08247145, Pub. Date Sep. 24, 1996.

*Primary Examiner*—Thomas R. Hannon
*Attorney, Agent, or Firm*—Browdy and Neimark

[57] ABSTRACT

The linear motion guide unit has the lubricating means that is easy to be handled, attached to and detached from the track rail by means of supporting a lubricant plate in a holder. The lubricating means has a lubricant plate divided into a pair of lubricant plate components disposed in symmetry with each other, and the holder of a frame surrounding the lubricant plate components to keep steadily the components. The lubricant plate components each have a protrusion which move in sliding contact with raceway grooves of the track rail so as to feed lubricant to the raceway grooves. The lubricant plate components have protrusions fitted into windows in the holder. A pair of the lubricant plate components is supported in such a manner that they are separated by a center wall extending at an upper section of the holder towards the track rail.

13 Claims, 5 Drawing Sheets

LINEAR MOTION GUIDE UNIT

FIELD OF THE INVENTION

The present invention relates to a linear motion guide unit applicable to robots, semiconductor manufacturing apparatus, machine tools and the like, and provided with lubricating means easily mounted to the unit.

DESCRIPTION OF THE RELATED TECHNOLOGY

The recent remarkable development in mechatronics technology requires linear motion guide units of improved precision, speed and miniaturization. The use of such apparatus extends into many technical fields. Linear motion guide units are, in general, employed in semiconductor manufacturing apparatus, measuring instruments, industrial robots and the like. For instance, robots for assembling are now manufactured in various types, and from a large scale to miniature, in accordance with expanded usage. The linear motion guide units to be incorporated in such assembling robots are required to have self-lubrication as well as high precision, high speed and miniaturization.

A conventional linear motion guide unit, as shown in FIG. 10, has a sliding element, or slider 1, straddling a track rail 2 so as to freely move along with respect to the track rail by circulation of rolling elements 7 along raceway grooves 4 on the rail 2. The track rail 2 has, on lengthwise side surfaces 3 thereof, the raceway grooves 4 and it has, on lengthwise upper surface 14 thereof, openings 13 spaced from each other. The track rail 2 is preferably fixed to a mounting base 20. Beds, platforms, working tables or the like are examples. The track rail 2 and the mounting base 20 are fixed by screwing bolts through the openings 13 of the track rail 2 and openings in the mounting base 20.

The slider 1 has a casing 5 movable with respect to the track rail 2, and end caps 6 attached to the opposing ends of the casing 5. Provided on the upper surface of the casing 5 are openings for fixtures, appliances, parts, chucks, grasping jaws or the like. Both the casing 5 and the end caps 6 are formed on the lower surfaces thereof with recesses 10 by which the casing 5 and end caps 6 may saddle (or, straddle) on track rail 2 for free movement. The recesses 10 are each formed with a raceway groove 9 in opposition to any one of the raceway grooves 4 on the track rail 2.

The rolling elements, or balls, 7 are confined for free movement in raceways defined by the raceway grooves 4 and 9. Retainer bands 18 are provided in the casing 5 so as to surround the balls 7 to prevent the balls 7 from falling out of the casing 5. Bottom seals 8 are secured to the lower surfaces of the slider 1 for sealing between the track rail 2 and the slider 1.

The end caps 6 are provided with claws for scooping up the balls 7 from the raceway grooves 4 forming the loaded track regions of the track rail 2. The end caps have direction-changing passages for circulating movement of the balls 7. Mounted on the end caps 6 are end seals 17 for sealing between the track rail 2 and the lengthwise opposing ends of slider 2. The end caps 6 are secured to the opposing ends of the casing 5 by means of bolts 25 screwed into fixture openings. The balls 7 move along the loaded regions, that is, the raceway grooves 4 of the track rail 2, and then come into the direction changing passages in the end caps 6. The balls 7 then move to the return passages 12 which are formed in the casing 5 in parallel with the raceway grooves 9. Thus the balls 27 circulate though the raceways, direction changing passages and return passages 12. As a result, the slider 1 moves smoothly relative to the track rail 2 by the action of the movement of the balls 27 along the raceway defined by the raceway grooves 4 and 9 of the track rail 2 and slider 1. Grease nipples 11 are provided on the end caps 6, and bores through the end seals 17 and end caps 6, for feeding lubricating oil to the raceway grooves 4, 9 in which the balls 7 are held for free movement.

Prior sealing means for a linear motion guide unit are disclosed in Japanese Patent Application Laid-Open Nos. 346919/1994, 35146/1995, 200362/1996, 247144/1996, 247145/1996 and 53637/1997.

Disclosed in Japanese Patent Application Laid-Open No. 346919/1994 is a sealing means for a side seal and an under seal secured to the slider in the linear motion guide unit, in which seal lips made of rubber or synthetic resin are provided for closing tightly clearances between the slider and the track rail. The lip seals keep in contact with the outer surfaces of the rail, and contain therein lubricant which is constantly, continuously oozed from the seal lips to the locations to be lubricated.

Shown in Japanese Patent Application No. 283634/1986 is a method of producing sintered material of continuous porosity, which comprises the steps of mixing powdered polyethylene of ultrahigh molecular weight and powdered molding agent of polyolefin resin at a pre-determined ratio, and sintering the mixture to thereby produce porous sintered material having therein continuous porosity of average pore diameter of from 10 to 150 micrometers and average porosity of from 25 to 45% by volume.

In the prior linear motion rolling guide unit shown in FIG. 10, lubricating oil or grease is, in general, used as lubricant. Grease is fed from grease nipples 11 to the raceways for the balls. Alternatively, lubricating oil is from the external piping through pipe joints attached to the slider. The slider conventionally has end seals for prevention of contamination by dust and other impurities, the end seals being made of core metal and rubber material such as acrylonitrile-butadiene rubber.

Linear motion guide units have recently come into common use over a wide area, under an adverse˜ situation where it's next to impossible to feed lubricant, or under severe environmental conditions where the units may be covered with a large quantity of dust or chips and where it is difficult to control the temperature. It is thus required to provide a linear motion guide unit which is free of lubrication maintenance.

The sealing means for linear motion guide units disclosed in Japanese Patent Application Laid-Open No. 346919/1994 has end seals made of rubber or synthetic resin containing lubricant. Disclosed in Japanese Patent Application Laid-Open No. 200362/1996 is an end seal made of polymer material containing lubricant.

Further disclosed in Japanese Patent Application Laid-Open Nos. 346919/1994, 200362/1996 and 53637/1997 is a sealing means made of lubricant-immersed polymer material which is manufactured by the steps of melting a mixture of olefinic polymer with poly (a-olefin) oil, pouring the mixture into a mold and solidifying the molded mixture by cooling. It, however, has required complicated, advanced technical skill.

SUMMARY OF THE INVENTION

An object of the present invention is to overcome the shortcomings as described above with reference to the prior art, and to provide a linear motion guide unit having lubricating means in which a lubricant plate is supported in a holder for easy attaching to and detaching from the casing of the lubricating means.

Another object of the present invention is to provide lubricating means for a linear motion guide unit, which is applicable to a conventional unit without design modification.

A further object of the present invention is to provide a linear motion guide unit capable of self-lubrication even under severe operating condition so as to be kept in good lubrication.

A further object of the present invention is to provide a linear motion guide unit having lubricating means which may achieve a long life-time by self-lubrication, improved protection against a dusty environment, and maintenance-free operation.

The present invention relates to a linear motion guide unit comprising a track rail provided at lengthwise side surfaces thereof with first raceway grooves, a sliding element movable relative to the track rail, wherein the sliding element has a casing provided with second raceway grooves in opposition to the first raceway grooves, rolling elements movable along raceways defined between the first and second raceway grooves, end caps secured to the opposing-end surfaces of the casing, lubricating means secured on the end caps for feeding lubricant to the raceways defined between the first and second raceway grooves, and end seals secured on the ends of the lubricating means, and further wherein the lubricating means each have a lubricant plate of porous sintered resin immersed with the lubricant, and a holder for supporting the lubricant plate.

The holder is made of any one of metal, synthetic resin and synthetic rubber. It is preferable that the holder is restorable to its former form, even if the holder is distorted for attaching the lubricating means to the track rail or the sliding element. In order to put the lubricant plate in the holder by deformation of the holder or to replace just the lubricating means leaving the casing, end caps and end seals on the track rail, it is preferable that the holder be subject to restorable plastic deformation or elastic deformation to the limit of damage in deformation. As a result, the lubricant plate is easily received in the holder and the lubricating means is simply mounted on the track rail.

The holder is made of a frame for receiving the lubricant plate therein, comprising an upper section, side sections depending from the upper section, and lower sections extending from the bottom ends of the side sections in directions opposing each other. With the lubricating means being mounted on the track rail, the upper section is parallel with the upper surface of the track rail, the side sections are parallel with the lengthwise side surfaces of the track rail, and lower sections extend towards the track rail.

The holder has windows at its top surface and side surfaces for economizing on material and permitting easy access to the lubricant plate after assembly of the lubricating means. For instance, the lubricant plate may be easily replenished with lubricant through the windows.

The lubricant plate is provided with first protrusions to be fitted into the windows for preventing the lubricant plate from falling off the holder when attaching to or detaching from the slider.

The holder has an end plate for covering the lubricant plate at the side of the end cap or the end seal. The end plate is to support the lubricant plate on its side surface for preventing the lubricant plate from falling off the holder.

The lubricant plate has second protrusions so as to be in sliding contact with the first raceway grooves of the track rail and to be movable with respect to the track rail. When the sliding element moves along the track rail, the lubricant plate also moves in sliding contact with the track rail at its second protrusions so that the lubricant contained in the lubricant plate is fed to the raceway grooves of the track rail to lubricate the rolling elements in the raceways defined between the raceway grooves of the sliding element and the track rail.

The lubricant plate is divided into two components, each of which is in sliding contact with either one of the raceway grooves on the lengthwise opposing side surfaces of the track rail. The arrangement of each of the divided components for each of the raceway grooves independently of each other results in the miniaturization of the lubricant plate and containment of the lubricant sufficient in amount to lubricate each raceway groove.

The divided lubricant plate components are arranged on the lengthwise side surfaces of the track rail in symmetry with each other. Assembling the lubricant plate into the holder, therefore, may be completed by putting merely mass-produced lubricant plate components of the same pattern in the holder in symmetry with each other, resulting in a reduction in manufacturing cost of the lubricating-means.

The upper section of the holder has a center wall extending towards the track rail, so that each lubricant plate components is each surrounded by the upper section, side section, lower section and center wall so as to be kept in the holder. It will be understood that each lubricant plate component is supported by the upper section, side section, lower section and center wall of the holder, excepting the face exposed for feeding lubricant to the track rail.

The center wall of the upper section is provided with an opening to communicate with grease nipples or lubricating oil-feeding joints on the end caps. In order to dispose the grease nipples or lubricating oil-feeding joints at the end caps, they have to go through the lubricating means. It is further preferred that the grease nipples or the lubricating oil-feeding joints have disposed at the center of the opposing ends of the casing and also bore through the holder which is higher in rigidity than the lubricant plate. Therefore, the center wall is provided with openings for the grease nipples or lubricating oil-feeding joints.

Bolts to secure the end seals, lubricating means and end caps to the casing are inserted through the end seals, end caps and cuts or holes in the holder of the lubricating means or collars fitted in the cuts or holes, and screwed into the openings of the casing. Where the holder is made of metal having sufficient strength, the bolts may be directly inserted through the cuts or holes in the holder. However, the collars should be prepared in the cuts or holes for holders of plastic lacking in strength.

According to the linear motion guide unit of the present invention, since the lubricating means incorporated in the casing is composed of the lubricant plate disposed for sliding movement in contact with the raceway grooves of the track rail and the holder for supporting the lubricant plate, the lubricating means may be handled through the holder with no direct contact with the lubricant plate, whereby the operator's hands are protected against smearing of lubricating oil as well as the lubricant plate itself being protected against dusty contamination. Further, the lubricating means may be mounted on the track rail with easy handling by merely deforming the holder.

In the linear motion guide unit constructed as described above, the lubricating means may be handled in such a condition that the holder always supports the lubricant plate. The lubricating means of the present invention is substantially covered with the holder, excepting the faces exposed for lubricating the raceway grooves, whereby the lubricating means is easy handle on attaching and/or detaching from the casing and also easy to keep it in stock. The lubricating means of the present invention has the advantage that the lubricant is fed to the raceways to keep good lubrication without fear of lack of lubricant, whereby the frictional resistance between the track rail and sliding element is steadily reduced, resulting in the protection against wear. The lubricating means of the present invention further may be incorporated in the conventional guide unit without substantial changes in principal design. The linear motion guide unit according to the present invention is capable of self-lubrication even under severe operating condition so as to be kept in good lubrication. The linear motion guide unit having lubricating means of the present invention may achieve a long life-time by self-lubrication, improved protection against a dusty environment by the covering function of the holder, and operate maintenance-free.

Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

Figure 1:
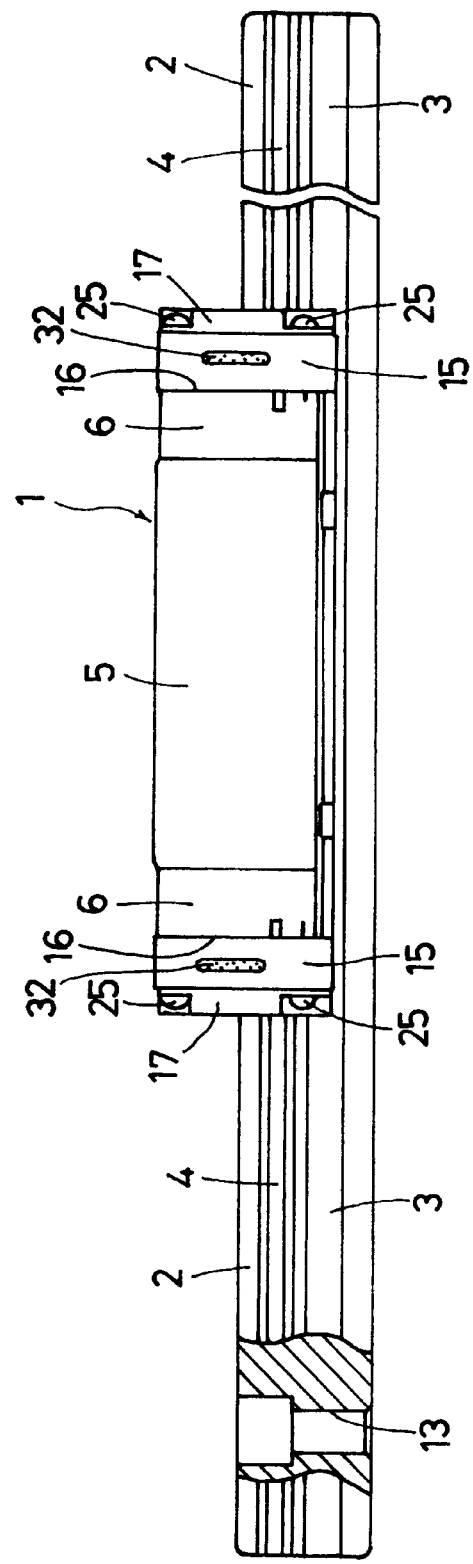
FIG. 1 is a side elevation view showing a preferred embodiment of a linear motion guide unit according to the present invention.

Referring now in detail to the drawings, the linear motion guide unit provided with lubricating means according to the present invention will be explained below, wherein like parts in each of the several figures are identified by the same reference character.

Figure 2:
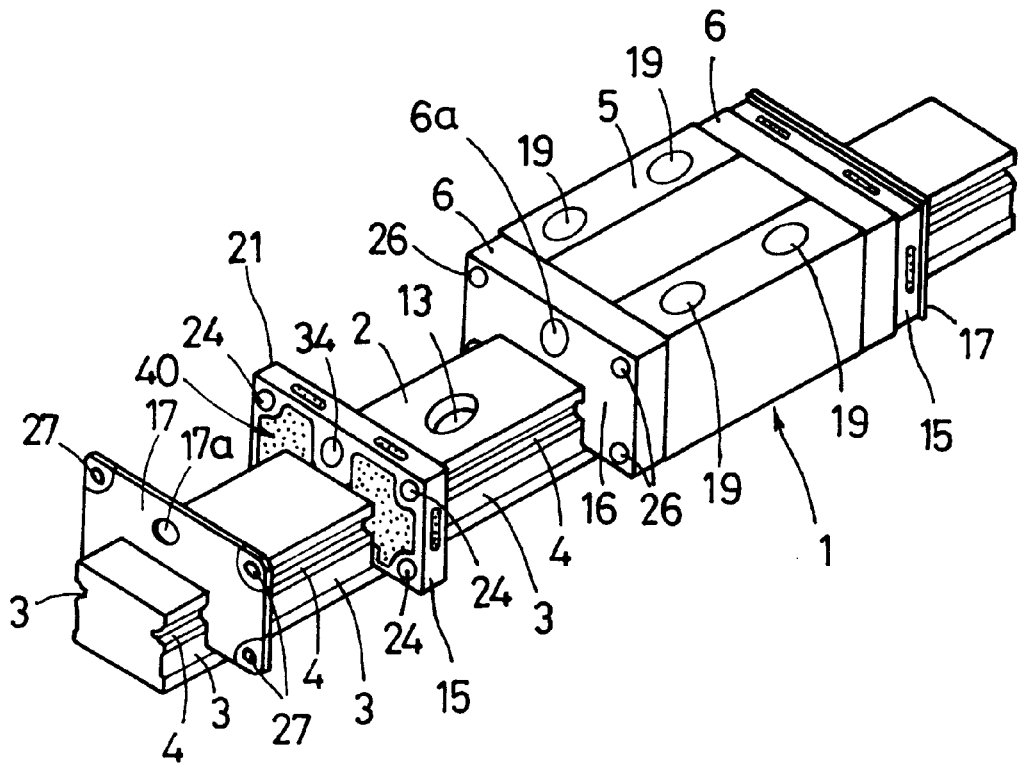
FIG. 2 is an exploded perspective view of the linear motion guide unit shown in FIG. 1.
Figure 3:
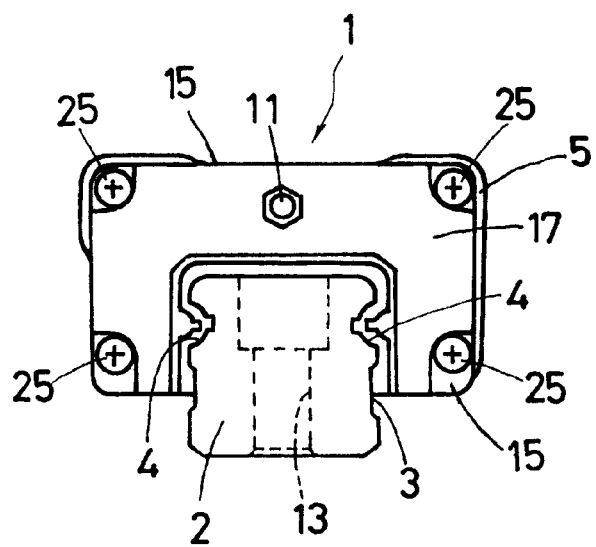
FIG. 3 is a front elevation view of the linear motion guide unit shown in FIG. 1.
Figure 4:
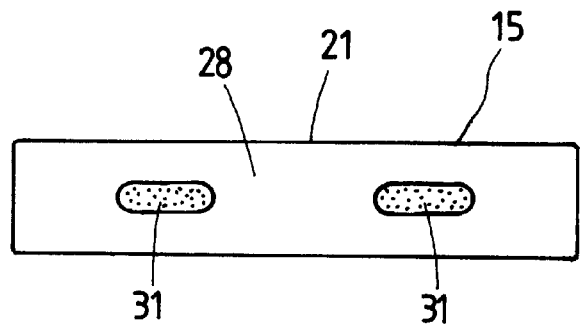
FIG. 4 is a plane view showing an embodiment of lubricating means to be incorporated in the linear motion guide unit shown in FIG. 1.
Figure 5:
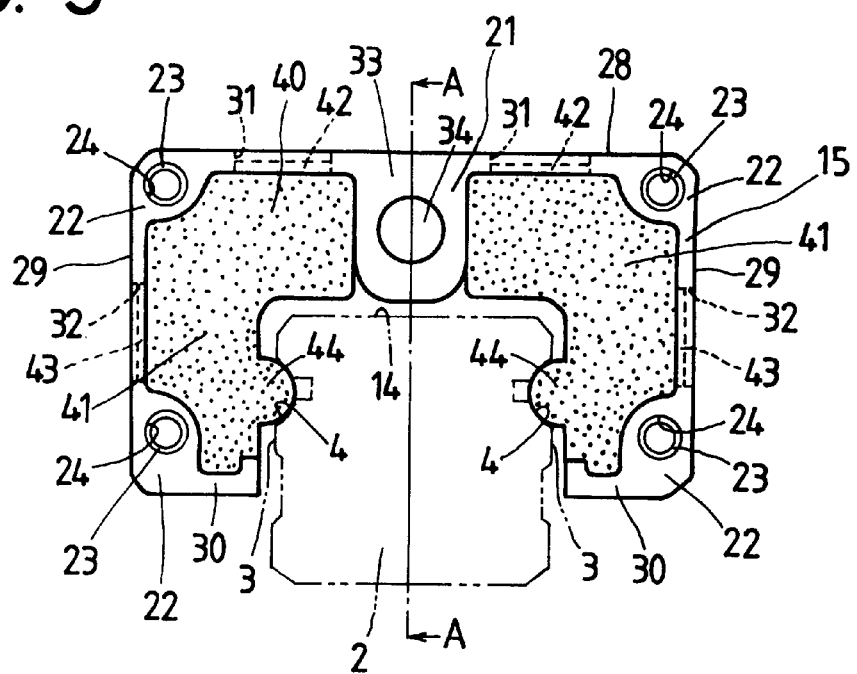
FIG. 5 is a front elevation view of the lubricating means shown in FIG. 4.
Figure 6:
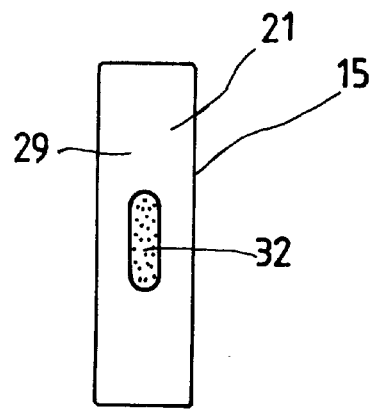
FIG. 6 is a side elevation view of the lubricating means shown in FIG. 4.
Figure 7:
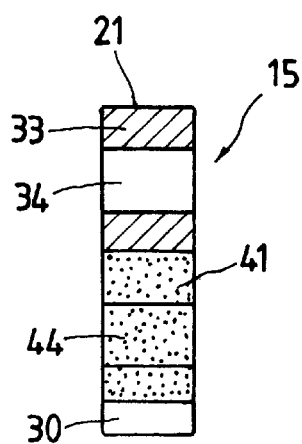
FIG. 7 is a sectional view of the lubricating means taken along the line A—A of FIG. 5.

Referring to FIGS. 1 to 3, the linear motion guide unit of the preferred embodiment described in connection with FIGS. 1 to 7 primarily comprises a track rail 2 provided on its lengthwise opposing side surfaces 3 with raceway grooves 4, a sliding element, or a slider 1, saddled on the track rail 2 for sliding movement. It will be seen that the track rail 2 is of a rectangular configuration in cross section, wherein the lengthwise opposing side surfaces 3 are recessed at the raceway grooves 4. The slider 1 is composed of a casing 5 movable with respect to the track rail 2, and end caps 6 secured to the ends of the casing 5, which ends are opposed lengthwise or along the moving direction of the slider 1.

Figure 10:
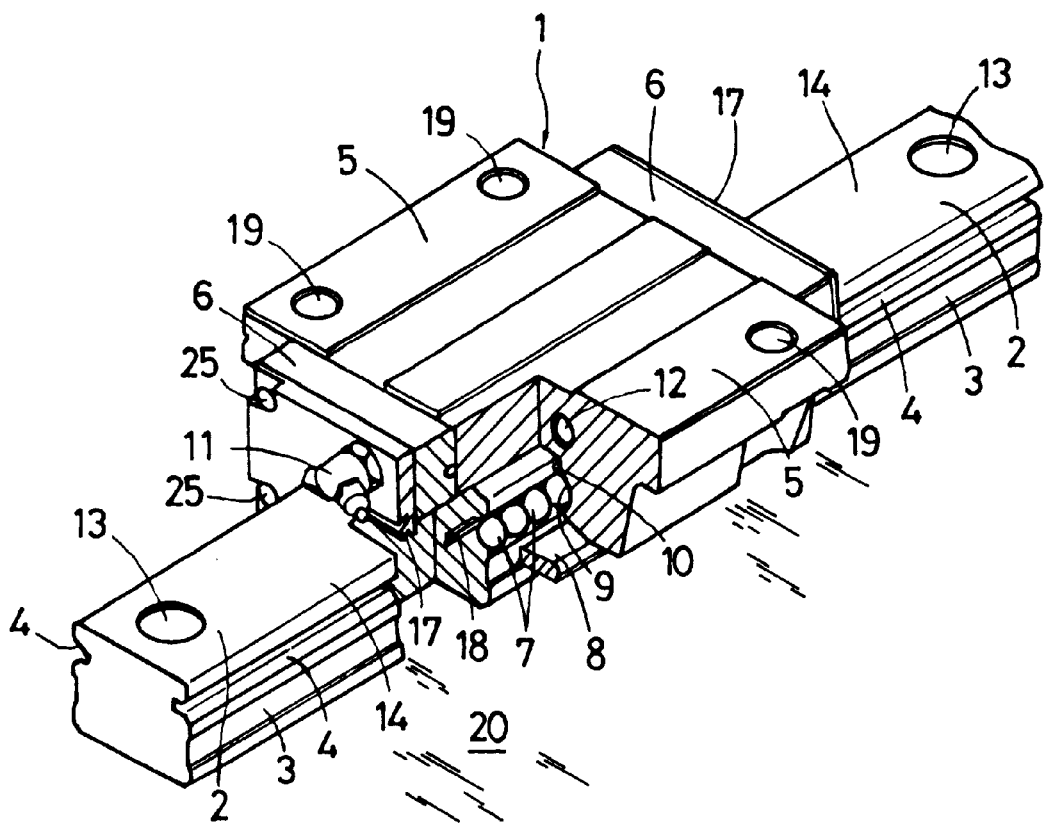
FIG. 10 is a partially cutaway perspective view showing a prior linear motion guide unit.

The slider 1 is similar or identical in its structure to the slider shown in FIG. 10, except for lubricating means 15. It will be noted that the casing 5 has raceway grooves 9 in opposition to the raceway grooves 4, and rolling elements 7 confined for free rotational movement in the space defined between the opposing raceway grooves 4 and 9. Retainer bands 18 are provided in the casing 5 so as to surround the rolling elements 7 for preventing the rolling elements from falling off the casing 5. Bottom seals 8 are provided on the lower surfaces of the end caps 6, as well as the casing 5, for sealing up the clearances between the lengthwise side surfaces 3 of the track rail 2 and both the casing 5 and end caps 6. The slider 1 may move freely by virtue of the rolling elements 7, which move in a circulating manner along the raceway grooves 4 of the track rail 2. The rolling elements 7, running through the raceway grooves 4 of the track rail 2 under load, are introduced in direction-changing passages formed in the end caps 6 and then move to return passages 12 that are formed in parallel with the raceway grooves in the casing 5. As a result, the rolling elements may move in a circulating manner. The slider 1 has a free sliding movement relative to the track rail 2 by virtue of the rolling motion of the rolling elements between the opposed raceway grooves 4, 9 of the track rail 2 and the slider 1.

The linear motion guide unit of the present invention has the feature that lubricating means 15 are arranged on the end surfaces 16 of the end caps 6 for sliding movement along the track rail 2, the lubricating means each comprising a lubricant plate and a holder supporting the lubricant plate therein. The lubricating means has a flat configuration that is even in thickness and gate-like in conformity with the end shape of the casing 5 so as to straddle the track rail 2. End seals 17 are each arranged on any one of the opposing ends of the lubricating means 15 for movement relative to the track rail 2. A holder 21 is, as a whole, of frame configuration, comprising an upper section 28, side sections 29 depending from the upper section, and lower sections 30 extending from the bottom ends of the side sections 29 in directions opposing to each other. With the lubricating means 15 being mounted on the track rail 2, the upper section 28 is parallel with the upper surface 14 of the track rail 2, and the side sections 29 are parallel with the lengthwise side surfaces 3 of the track rail 2. The lower sections 30 extend in parallel with the upper section 28 and towards the lengthwise side surfaces 3 of the track rail 2. The lubricating plate 40 is surrounded around its periphery with the holder 21, except for an area opposed to the track rail 2. The lubricating plate 40 is exposed at its surfaces so as to face against the end caps 6 and end seals 17, which surfaces are to be covered by the end caps 6 and end seals 17 upon assembly with the slider 1. The holder 21 covers the outer periphery of the lubricating plate 40 to thereby seal up pores of the porous structure in the plate, resulting in protection of the lubricating plate against dusty contamination, mechanical damage, and leakage of lubricant.

The holder 21 is made of any one of metal, synthetic resin, and synthetic rubber. It is preferable that the holder 21 is made of material restorable to its former form, even if the holder 21 is distorted when attaching the lubricating means 15 to the track rail 2 or the slider 1. In order to put the lubricant plate 40 in the holder 21 or to replace the lubricating means 15 without disturbing the casing 5, end caps 6, and end seals 17 on the track rail 2, it is preferable that the holder 21 may be subjected to restorable plastic deformation or elastic deformation to the limit of damage by deformation. As a result, the lubricant plate 40 is easily received in the holder 21 and the lubricating means 15 is simply mounted on the track rail 2.

To secure the lubricating means 15 to the lengthwise opposing ends of the slider 1, in compression against the end surfaces of the end caps 6, each lubricating means 15 is reinforced at its four corners 22 where holes 24 are provided for fixing bolts 25. Both the end caps 6, and the end seals 17 to sandwich the holder 21 between them, have holes 26, 27 for the fixing bolts 25 in alignment with the holes 24 in the holder 21. By inserting the fixing bolts 25 in turn through the holes 26, 24 and 27 of the end seals 17, holders 21, and end caps 6, and screwing the bolts into the holes in the casing 5 of the slider 1, all of the end caps 6, holders 21, and end seals 17 are secured to the slider 1 in such a relation that the holders 21 are each sandwiched between the end caps 6 and the end seal 17. In case the holder 21 is made of synthetic resin or synthetic rubber, collars 23 are preferably disposed in the holes 24 so as to share partially with the collars 23 the tightening force caused by bolts 25.

The lubricant plate 40 is divided into two components 41, each of which is in sliding contact with one of the raceway grooves 4 on the lengthwise opposing side surfaces 3 of the track rail 2. The lubricant plate components 41 are contained in the holder 21 so as to be separated from each other by means of a center wall 33. It will be thus understood that the lubricating means 15 is fixed to the casing 5 in such a manner that the lubricant plate components 41 covered with the holder 21, are each disposed in opposition to the track rail 2. The holder 21 is to protect against dusty contamination, mechanical damage and leakage of lubricant as well as to keep the lubricant plate components steady. The lubricant plate components 41 are each enough in volume to contain the lubricant necessary to lubricate each raceway groove 4, resulting in miniaturization of the lubricant plate 40.

The divided lubricant plate components 41 are arranged on the lengthwise side surfaces of the track rail 2 in symmetry with each other. Assembling of the lubricant plate 40 into the holder, therefore, may be completed by putting merely mass-produced lubricant plate components 41 of the same pattern in the holder 21 in symmetry with respect to the line B—B in FIG. 5, resulting in a reduction in manufacturing cost of the lubricating means 15. It will be noted that the holder 41 is also formed in line symmetry.

The upper section 28 of the holder 21 has a center wall 33 extending towards the upper surface 14 of the track rail 2, so that the lubricant plate components 41 are each surrounded by the center wall 33, upper section 28, side section 29, and lower section 30 so as to be kept in the holder 21 separate from each other. It will be understood that the lubricant plate components 41 are each supported by the sections and center wall of the holder 21, excepting the face exposed for feeding lubricant to the track rail 2.

In the lubricating means 15 of the present invention, the holder 21 has windows 31, 32 at its upper section 28 and side sections 29 for economizing on material and permitting easy access to the lubricant plate 40 after assembly of the lubricating means 15. For instance, the lubricant plate 40 may be easily replenished with lubricant as well as inspected through the windows 31, 32.

The lubricant plate components 41 are provided with first protrusions 42, 43 to be engaged with the windows 31, 32. It will be noted that the lubricant plate components 41 are of a configuration that is correspondent with the contour defined by the upper section 28, side sections 29, and lower sections 30, and are provided with protrusions 42, 43 matching the windows 31, 32. The protrusions are, in height, about a half of the depth of the windows 31, 32 so that no protrusion is over the holder 21. Engagement of the protrusions 42, 43 with the windows 31, 32 of the holder 21 may be made by elastic deformation or plastic deformation of both, or any one of, the holder 21 and the lubricant plate components 41; for instance, by somewhat spreading the holder 21 or by compressing the lubricant plate components 41. The lubricating plate components 41 kept are steady kept in the holder 21 by engagement of their protrusions 42, 43 with the windows 31, 32 of the holder 21, preventing the lubricant plate components 41 from falling art of the holder 21 upon attaching to or detaching from the slider 1.

The porous sintered synthetic resin for the lubricant plate 40 is fabricated by filling a mold with fine powdered synthetic resin, and heating the molded synthetic resin under pressure. The lubricant plate 40 has second protrusions 44 extending towards the track rail 2 so as to be in sliding contact with the first raceway grooves 4 of the track rail 2. Upon the sliding element moving along the track rail 2, the lubricant plate 40 also moves in sliding contact with the track rail 2 at its second protrusions 44 so that the lubricant or lubricating oil contained in the lubricant plate 40 is constantly fed to the raceway grooves 4. Of course, the sliding contact of the lubricant plate 40 with the track rail 2 may be extended over the whole zone where the lubricating plate is exposed to the track rail. It is, however, preferred that the sliding contact zone is reduced to the minimum required according to the operating condition for reduction of consumption of lubricant.

The porous sintered synthetic resin for the lubricant plate 40 is fabricated by filling a mold with, for example, powdered ultrahigh molecular weight synthetic resin of a predetermined grading, for example, fine grain size of 30 micrometers or coarse grain size of from 250 micrometers to 300 micrometers, and heating the molded synthetic resin under pressure. The sintered synthetic resin has open pores with a three-dimensional network structure. The porous sintered synthetic resin of the lubricant plate 40 has, for example, porosity of from 40% to 50%.

The lubricant plate 40 is immersed in lubricant, or turbine oil, and the pores are filled with the oil. With the lubricant plate 40 being immersed in lubricating oil for 30 minutes, the lubricating plate 40 may be regulated to a percentage of oil content of 40% by weight and oil content of about 2 cc. The percentage of oil content may be controlled in accordance with the operating condition of the slider 1.

The combination of the sintered resin with the lubricating oil of the lubricant plate 40 may be determined in conformity with their properties, so that the lubricant plate is easy to handle and to modify the specifications. Further, since the sintered resin for the lubricant plate 40 may be formed simply with high accuracy, for example, an accuracy of finishing within about +0.025, the sintered resin is very suitable for parts in a linear motion guide unit, that are incorporated into precision machines.

Figure 8:
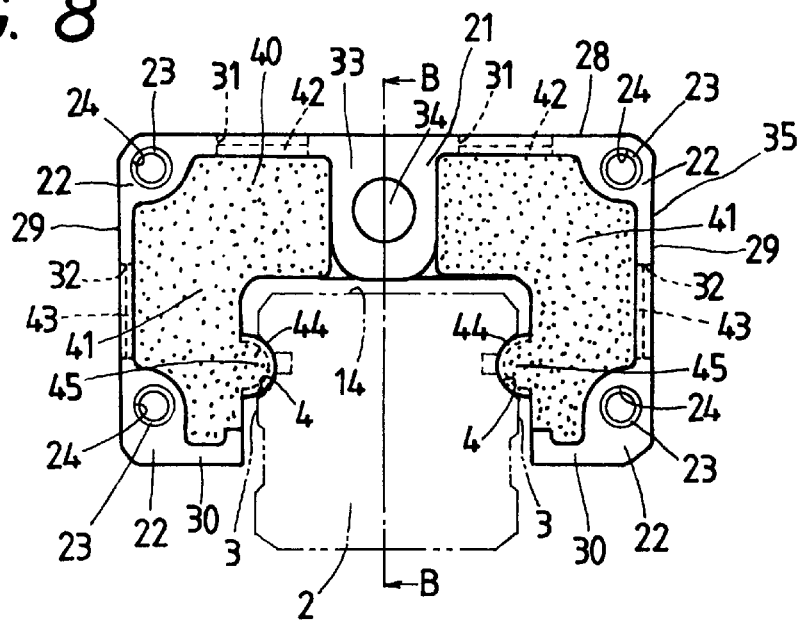
FIG. 8 is a front elevation view of another embodiment incorporated in the linear motion guide-unit shown in FIG. 1.
Figure 9:
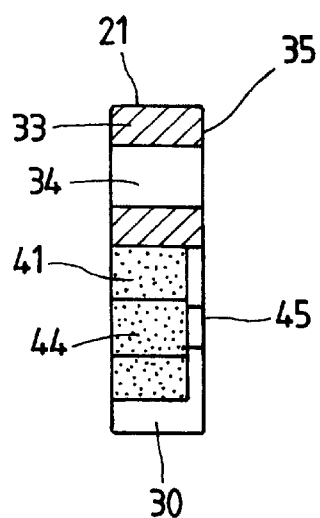
FIG. 9 is a section view of the lubricating means and being taken along the line B—B of FIG. 8.

FIGS. 8 and 9 show another embodiment of the linear motion guide unit, wherein the parts common to the embodiments in FIGS. 1 to 7 are identified by the same reference character and the detailed descriptions thereof are omitted below. In connection with lubricating means 35, a facing plate 45 is provided to cover the surface of the lubricant plate 40 on either a side opposing the end cap 6 of the slider 1 or another side opposing the end seal 17. The lubricant plate 40, or the components 41, is supported at any one of its opposing side surfaces by the facing plate 45 so as to prevent the slider 1 from falling upon transportation and storage.

According to the linear motion guide unit as described above, the lubricating means 15, 35 are movable with the slider 1 relative to and along the raceway grooves 4 of the track rail 2. It will be noted that the lubricating oil contained in the lubricant plate 40 in the lubricating means 15, 35 is fed onto the raceway grooves 4, along which the rolling elements roll and move, to thereby lubricate the raceway grooves 9 in the slider 1.

Methods of mounting the lubricating means 15, 35 to the track rail 2 may be determined in accordance with the operating conditions. The lubricating means 15, 35 having the holder 21 with the lubricant plate 40 therein may be directly mounted from above by being somewhat stretched. In case the deformation of the lubricating means 15, 35 is too much for mounting to the track rail 2, the lubricating means 15, 35 may be fitted on the track rail 2 by sliding them from the end of the track rail 2. Alternatively, the lubricating means 15, 35 may be completed by incorporating the lubricant plate 40 into the holder 21 at every side surface of the track rail 2.

That is, with the lubricating plate 40 accompanying the holder 21 in abutting manner to the raceway grooves 4, the relative sliding movement of the lubricant plate 40 and the holder 21 results in assembling of the plate with the holder.

Depending on the situation, it is required to provide grease nipples 11 or pipe joints for feeding lubricant or lubricating oil to the raceway grooves 4 from the outside, in addition to the lubricant feed from the lubricant plate 40. In order to communicate between the grease nipples and the casing 5, the nipples have to go through the lubricating means 15, 35. It is preferred that the grease nipples 11 be disposed at the center of the opposing ends of the slider 1 and also bore through the holder 21 which is relatively higher in rigidity. Therefore, the center wall 33 of the holder 21 is provided with an opening to communicate with grease nipples 11 in alignment with the openings 6a in the end caps 6 and the openings 17a in the end seals 17.

Instead of the holes 24 for inserting bolts 25 into the holder 21, cuts may be prepared in the holder 21. In this case, the collars 23 are disposed in the cuts. Alternatively, disposed between the lubricating m-means 15 and the end caps 6 may be washers, not shown, of sheet for protecting the end caps 6 and the lubricating means 15 against mechanical deformation. Further, instead of openings 34, the holder 21 may be recessed for the grease nipples 11.

The lubricant plate 40 may be varied in porosity according to zones in the lubricating means. For example, with the lubricant plate 40 being of high density in the zones making sliding contact with the raceway grooves of the track rail 2 and of low density in the residual zones, the lubricating oil may smoothly flow from the low density zones to the high density zones whereby the lubrication is kept good. The lubricant plate 40 may be provided on the surface thereof with a skin layer which is fabricated by coating with resin or melting the surface of the plate excepting both of the zones making sliding contact with the raceway grooves 4 of the track rail 2 and also the zones exposed to the windows 31, 32 for replenishment of lubricating oil. Alternatively, a reservoir for lubricating oil may be provided to the lubricant plate 40 in correspondence with the window 31 in the upper section 28.

While the present invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A linear motion guide unit comprising a track rail provided at lengthwise side surfaces thereof with first raceway grooves, a sliding element movable relative to the track rail, wherein the sliding element has a casing provided with second raceway grooves in opposition to the first raceway grooves, rolling elements movable along raceways defined between the first and second raceway grooves, end caps secured to the opposing end surfaces of the casing, lubricating means secured on the end caps for feeding lubricant to the raceways defined between the first and second raceway grooves, and end seals secured on the ends of the lubricating means, and further wherein the lubricating means each have a lubricant plate of porous sintered resin immersed with the lubricant, and a holder for supporting the lubricant plate.

2. A linear motion guide unit according to claim 1, wherein the holder is made of any one of metal, synthetic resin and synthetic rubber.

3. A linear motion guide unit according to claim 1, wherein the holder comprises an upper section, side sections depending from the upper section, and lower sections extending from the bottom ends of the side sections towards the track rail.

4. A linear motion guide unit according to claim 3, wherein windows are provided at any one of the upper section and side sections of the holder.

5. A linear motion guide unit according to claim 4, wherein the lubricant plate has protrusions to be fitted in the windows.

6. A linear motion guide unit according to claim 1, wherein the holder comprises a facing plate to cover the surface of the lubricant plate is provided on any one side of a side opposing to the end cap and another side opposing to the end seal.

7. A linear motion guide unit according to claim 1, wherein the lubricant plate has second protrusions movable along the track rail and in sliding contact with at least the raceway grooves of the track rail.

8. A linear motion guide unit according to claim 1, wherein the lubricant plate is divided into two components, each of which is correspondent with any one of the lengthwise opposing side surfaces of the track rail.

9. A linear motion guide unit according to claim 8, wherein the lubricant plate components are of the configuration in symmetry with each other with respect to the lengthwise opposing side surfaces of the track rail.

10. A linear motion guide unit according to claim 8, wherein the holder comprises an upper section, side sections depending from the upper section, and lower sections extending from the bottom ends of the side sections towards the track rail, and the lubricant plate components are surrounded by the center wall, upper section, side sections and lower sections of the holder so as to be steadily kept in the holder.

11. A linear motion guide unit according to claim 10, wherein the holder is provided at its center wall with an opening for feeding oil.

12. A linear motion guide unit according to claim 1, wherein bolts fix all of the end caps, lubricating means and end seals to the casing by being inserted through holes in the end caps, end seals and the holder of the lubricating means and screwed into the holes in the casing.

13. A linear motion guide unit according to claim 12, wherein collars are disposed in the holes in the holder and the bolts are inserted through the collars.

* * * * *